Patented Aug. 23, 1949

2,480,056

UNITED STATES PATENT OFFICE 2,480,056

HETEROCYCLIC NITROGEN BASE SALTS OF 3-METHYL-BUTYL, 2-ETHYL-HEXYL ORTHOPHOSPHATE

Herschel G. Smith, Wallingford, and Troy L. Cantrell, Lansdowne, Pa., assignors to Gulf Oil Corporation, Pittsburgh, Pa., a corporation of Pennsylvania No Drawing. Application January 11, 1946, Serial No. 640,666

6 Claims. (Cl. 260—286)

This invention relates to new chemical compounds and processes and more particularly to new heterocyclic nitrogen base salts of 3-methyl-butyl, 2-ethyl-hexyl orthophosphate which are useful for various technical purposes especially in the petroleum industry.

This application is a continuation-in-part of our copending applications Serial No. 454,460, filed August 11, 1942, now U. S. Patent 2,397,378; Serial No. 459,179, filed September 21, 1942, now U. S. Patent 2,397,379; Serial No. 459,180, filed September 21, 1942, now U. S. Patent 2,397,380; and Serial No. 479,794, filed March 19, 1943, now U. S. Patent 2,397,381.

This invention has as an object the manufacture of new chemical compounds that are technically useful. A further object is to prepare these new compounds by novel and easily conducted processes. A still further object is to utilize these new compounds for various technical purposes. Other objects will appear hereinafter.

These objects are accomplished in accordance with the present invention by making salts of isoamyl octyl phosphate (3-methyl-butyl, 2-ethyl-hexyl orthophosphate) and heterocyclic nitrogen bases wherein a nitrogen atom is in a hexatomic ring also containing four carbon atoms and one other atom which is either oxygen or carbon.

In preparing these new salts, the selected heterocyclic nitrogen base is reacted with 3-methyl-butyl, 2-ethyl-hexyl orthophosphate to obtain the desired heterocyclic nitrogen base salt thereof; the pH of the reaction mixture being adjusted to within the range 2.0 to 5.5 in preparing and recovering said salt. For example, pyridine is brought into reaction with 3-methyl-butyl, 2-ethyl-hexyl orthophosphate, and the pH of the reaction mixture is adjusted to within the range 2 to 5.5. With the theoretical molecular ratio of the two reactants, namely 1:1, the product is apt to be slightly too acid, with a pH below 2, and this is taken care of by using a slight excess of pyridine so that the molecular ratio is between 1:1 and 1:1.1.

Isoamyl octyl orthophosphate, which is also called 3-methyl-butyl, 2-ethyl-hexyl orthophosphate, is a brown, oily liquid; its specific gravity is 1.009 at 24°/4° C., and its viscosity is 210, 75 and 29 centipoises at 25, 50 and 75° C. respectively. It is insoluble in water and soluble in minerals oils to the extent of 11.70 parts in 100 parts of oil at 20° C. It has the structural formula:

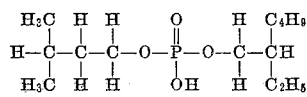

The following examples illustrate but do not limit our invention.

Example I

Seventy-nine pounds of pyridine were added to an iron vessel equipped with an air lance and 281 pounds of 3-methyl-butyl, 2-ethyl-hexyl orthophosphate were introduced over a period of one hour; the slow rate of addition being desirable to maintain the temperature of the reaction mixture below 212° F. At the conclusion of this reaction, the temperature was 180° F., and the pH of the mixture was 2.0. A pH of 3.5 was desired; 8 pounds of pyridine were added, which brought the pH to 3.5. The reaction product was an oily liquid which was readily soluble in mineral oils.

The reaction product described above has the structural formula:

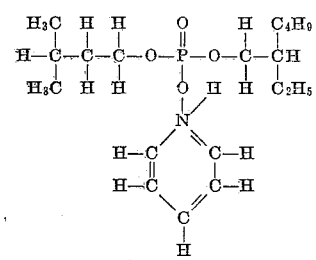

As the pyridine isoamyl octyl phosphate is substantially insoluble in water, the pH equivalent is measured by the following expedient. Normal butanol (which contains a small amount of water) is adjusted to exact neutrality, pH=7.0, and the sample is dissolved therein. The pH of the solution is then measured in the ordinary way as for aqueous solutions, by electrometric or colorimetric methods. The butanol appears to serve as a blending agent, for dissolving the sample in the water.

It will be noted that the measured pH of the aminophosphate is low despite the fact that a slight excess of amine is present. This is because the reaction involves neutralizing a rather strong acid with a very weak base.

Example II

One hundred and seven pounds of 2,6-lutidine were added to an iron vessel equipped with an air lance, and 281 pounds of 3-methyl-butyl, 2-ethyl-hexyl orthophosphate were introduced over a period of one hour; the slow rate of addition being desirable to maintain the temperature of the reaction mixture below 212° F. At the conclusion of this reaction, the temperature was 180° F., and the pH of the mixture was 2.0. A pH of 3.5 was desired; a further 11 pounds of 2,6-lutidine were added, which brought the pH to 3.5. The reaction product was an oily liquid which was readily soluble in mineral oils.

The reaction product of 2,6-lutidine with 3-methyl-butyl, 2-ethyl-hexyl orthophosphate has the following structural formula:

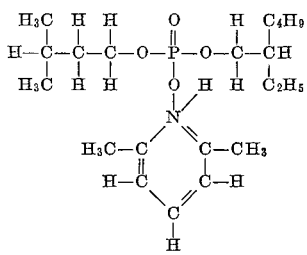

As the 2,6-lutidine isoamyl octyl phosphate is substantially insoluble in water, the pH equivalent is measured by the expedient described above in Example I. Here again, the measured pH of the aminophosphate is low despite the fact that a slight excess of amine is present.

*Example III*

One hundred and twenty-nine pounds of quinoline were added to an iron vessel equipped with an air lance, and 281 pounds of 3-methyl-butyl, 2-ethyl-hexyl orthophosphate were introduced over a period of one hour; the slow rate of addition being desirable to maintain the temperature of the reaction mixture below 212° F. At the conclusion of this reaction, the temperature was 180° F., and the pH of the mixture was 2.0. A pH of 3.5 was desired; a further 13 pounds of quinoline were added, which brought the pH to 3.5. The reaction product was an oily liquid which was readily soluble in mineral oils.

The reaction product of quinoline with 3-methyl-butyl, 2-ethyl-hexyl orthophosphate has the following structural formula:

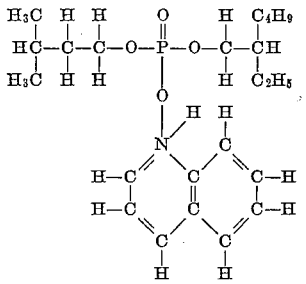

As the quinoline isoamyl octyl phosphate is substantially insoluble in water, the pH equivalent is measured by the following expedient. Normal butanol (which contains a small amount of water) is adjusted to exact neutrality, pH=7.0, and the sample is dissolved therein. The pH of the solution is then measured in the ordinary way as for aqueous solutions, by electrometric or colorimetric methods. The butanol appears to serve as a blending agent for dissolving the sample in water.

It will be noted that the measured pH of this aminophosphate is low despite the fact that a slight excess of amine is present. This is because the reaction involves neutralizing a rather strong acid with a very weak base. Moreover, traces of mono-, di- and tribasic acids may be formed under the conditions of the pH determination.

While the examples above describe the pyridine, lutidine, and quinoline salts of 3-methyl-butyl, 2-ethyl-hexyl orthophosphate, the invention extends generically to any salt of 3-methyl-butyl, 2-ethyl-hexyl orthophosphate and a heterocyclic nitrogen base wherein a nitrogen atom is in a hexatomic ring that also contains four carbon atoms and one other atom selected from the group consisting of carbon and oxygen. Among the heterocyclic nitrogen bases containing a nitrogen atom in a hexatomic ring that may be used in making the salts of 3-methyl-butyl, 2-ethyl-hexyl orthophosphate comprehended by the present invention are pyridine, alpha-picoline, beta-picoline, gamma-picoline, the isomeric ethyl pyridines, conyrine; 2,4-lutidine; 2,6-lutidine; commercial mixtures of isomeric lutidines, aldehydine, the isomeric collidines, parvoline, parvuline, quinoline, quinaldine, lepidine, isoquinoline, nicotine, piperidine, N-methyl piperidine, decahydroquinoline, morpholine, N-methyl morpholine, and N-phenyl morpholine. It is apparent that many of the heterocyclic nitrogen bases mentioned in the preceding sentence are tertiary bases wherein a nitrogen atom is in a pyridine ring. Many of these tertiary heterocyclic nitrogen bases are tertiary coal tar bases of the pyridine and quinoline series.

As is shown in our prior copending applications of which this application is a continuation-in-part, these salts are excellent foam suppressors for oils, while they have no deleterious effect on the lubricating properties or other properties of lubricating oils.

While our invention has been described above with reference to various specific examples and embodiments, it will be understood that the invention is not limited to such illustrative examples and embodiments, but may be variously practiced within the scope of the claims herein made.

What we claim is:

1. A salt of 3-methyl-butyl, 2-ethyl-hexyl orthophosphate and a heterocyclic nitrogen base wherein a nitrogen atom is in a hexatomic ring containing in addition to said nitrogen atom four carbon atoms and one other atom selected from the group consisting of carbon and oxygen, said oxygen atom being para to the nitrogen atom.

2. A salt of 3-methyl-butyl, 2-ethyl-hexyl orthophosphate and a tertiary heterocyclic nitrogen base wherein the nitrogen atom is in a pyriline ring.

3. A salt of 3-methyl-butyl, 2-ethyl-hexyl orthophosphate and a heterocyclic nitrogen base wherein the nitrogen atom is in a quinoline base.

4. The pyridine salt of 3-methyl-butyl, 2-ethyl-hexyl orthophosphate.

5. A lutidine salt of 3-methyl-butyl, 2-ethyl-hexyl orthophosphate.

6. The quinoline salt of 3-methyl-butyl, 2-ethyl-hexyl orthophosphate.

HERSCHEL G. SMITH.
TROY L. CANTRELL.

REFERENCES CITED

The following references are of record in the file of this patent:

Patterson et al., "The Ring Index" (Reinhold Publishing Co., New York; 1940), pages 50 and 51.

Certificate of Correction

Patent No. 2,480,056 August 23, 1949

HERSCHEL G. SMITH ET AL.

It is hereby certified that error appears in the printed specification of the above numbered patent requiring correction as follows:

Column 4, lines 54 and 55, for "pyriline" read *pyridine*;

and that the said Letters Patent should be read with this correction therein that the same may conform to the record of the case in the Patent Office.

Signed and sealed this 20th day of December, A. D. 1949.

[SEAL]

THOMAS F. MURPHY,
*Assistant Commissioner of Patents.*